(12) United States Patent
Poli et al.

(10) Patent No.: US 9,043,854 B2
(45) Date of Patent: May 26, 2015

(54) PROVISIONING A SET-TOP BOX (75) Inventors: Christopher Poli, Doylestown, PA (US);
David H. Brouda, Chalfont, PA (US);
Glen P. Goffin, Dublin, PA (US);
Robert E. Mack, Collegeville, PA (US)

(73) Assignee: ARRIS Technology, Inc., Suwanee, GA (US)

(*) Notice: Subject to any disclaimer, the term of this patent is extended or adjusted under 35 U.S.C. 154(b) by 572 days.

(21) Appl. No.: 12/569,873

(22) Filed: Sep. 29, 2009

(65) Prior Publication Data
US 2011/0078757 A1    Mar. 31, 2011

(51) Int. Cl.
| | |
|---|---|
| H04N 7/173 | (2011.01) |
| H04N 21/658 | (2011.01) |
| H04N 7/10 | (2006.01) |
| H04N 21/254 | (2011.01) |
| H04N 21/258 | (2011.01) |
| H04N 21/2668 | (2011.01) |
| H04N 21/472 | (2011.01) |
| H04N 21/2225 | (2011.01) |

(52) U.S. Cl.
CPC ............ *H04N 21/6581* (2013.01); *H04N 7/10* (2013.01); *H04N 7/17354* (2013.01); *H04N 7/17309* (2013.01); *H04N 7/17318* (2013.01); *H04N 21/2541* (2013.01); *H04N 21/25833* (2013.01); *H04N 21/2668* (2013.01); *H04N 21/47202* (2013.01); *H04N 21/2225* (2013.01)

(58) Field of Classification Search
CPC .......... H04N 7/17354; H04N 7/17309; H04N 7/17318; H04N 7/10; H04N 21/47202

USPC .......................................... 725/132; 370/392
See application file for complete search history.

(56) References Cited

U.S. PATENT DOCUMENTS

| | | | |
|---|---|---|---|
| 6,745,391 B1* | 6/2004 | Macrae et al. ................ 725/42 |
| 7,386,879 B1* | 6/2008 | Van Willigen .................. 726/4 |
| 7,827,573 B2* | 11/2010 | Taylor et al. .................... 725/25 |
| 2003/0048380 A1* | 3/2003 | Tamura .......................... 348/552 |
| 2003/0198223 A1* | 10/2003 | Mack et al. ................... 370/392 |
| 2005/0212504 A1* | 9/2005 | Revital et al. ................. 324/100 |
| 2007/0209052 A1 | 9/2007 | Taylor et al. |
| 2008/0153482 A1* | 6/2008 | Kongalath .................. 455/432.1 |
| 2010/0023962 A1* | 1/2010 | Blommaert et al. ............ 725/31 |
| 2010/0287582 A1* | 11/2010 | Barnett, Jr. ...................... 725/25 |

OTHER PUBLICATIONS

Office Action mailed Nov. 20, 2012, in Canadian Patent Application No. CA 2714267.

* cited by examiner

*Primary Examiner* — Benjamin R Bruckart
*Assistant Examiner* — Anthony Bantamoi
(74) *Attorney, Agent, or Firm* — Lori Anne D. Swanson (57) ABSTRACT

A method of provisioning a set-top box (STB) with a provisioning server is disclosed. In the method, a provisioning request is received from a STB, where the provisioning request includes a provisioning stream identifier, an authorization server identifier, and a STB address. The provisioning server requests a provisioning system generate a configuration for the STB, where the configuration includes a channel map and basic code. The provisioning server receives the configuration from the provisioning system. The provisioning server prepares provisioning information, including the configuration for the STB and sends the provisioning information to the STB using the identifier for the STB.

20 Claims, 5 Drawing Sheets

FIG. 3

PROVISIONING A SET-TOP BOX

BACKGROUND

In a cable television network, which is typically a hybrid fiber-coaxial (HFC) network or a fiber-optic network, subscribers are provided with a set-top box that is used to connect the subscriber's television, and potentially other electronic equipment, with the cable television network. Similarly, a digital subscriber line access multiplexer (DSLAM) network can also be used to deliver services to a subscriber's television.

The set-top box is usually connected to the network through a co-axial wall outlet. The set-top box is essentially a computer that is programmed to process the signals from the network so as to provide the subscriber with the services. The set-top box is one embodiment of a device designed to provide a subscriber with services. These services from the network operator typically include access to a number of television channels and, perhaps, an electronic programming guide (EPG). Additional premium channels may also be provided to subscribers for an additional fee. Pay-per-view events and video-on-demand service may also be provided over the network. The set-top box is programmed to provide these services to the subscriber. Services are known to be provided to each subscriber based on specific authorizations associated with each subscriber account.

To access the television services, the subscriber receives services through the set-top box that is typically issued by the service provider. Prior to the service provider giving the set-top box to the subscriber, the set-top box information is stored in the service provider's inventory and an account is created for the subscriber. Typically, the installer of the set-top box or other service provider personnel has to access a standard billing system port to tie the set-top box to the account and to authorize specific services. Then, the set-top box is installed in the subscriber's premises. In some instances, the subscriber is able to select different services after the set-top box is connected to the network at the subscriber premises to receive services, but the subscriber's account will have been previously created and the set-top box information previously stored in the inventory system of the service provider.

SUMMARY

Disclosed herein is a method for provisioning a set-top box (STB) with a provisioning server including a processor and a storage device, according to an embodiment. The STB is provisioned without first assigning the STB to a user's account. In the method, a provisioning request is received from the STB. The provisioning request includes a provisioning stream identifier, an authorization server identifier, and a STB address. The STB address is a unique addressable identifier for the STB. Thereafter, the provisioning server requests a provisioning system to generate a configuration for the STB. The configuration includes a channel map and basic code. The provisioning server receives the configuration from the provisioning system and prepares provisioning information. The provisioning information includes the configuration for the STB. The provisioning server then sends the provisioning information to the STB using the identifier for the STB.

Also disclosed herein is a provisioning server including a processor and storage device, according to an embodiment. The provisioning server is configured to receive a provisioning request from a STB. The provisioning request includes a provisioning stream identifier, an authorization server identifier, and a STB address. The provisioning server is thereafter operable to request a provisioning system generate a configuration for the STB, the configuration includes a channel map and basic code. The provisioning server receives the configuration from the provisioning system. The provisioning server then prepares provisioning information, the provisioning information including the configuration for the STB. The provisioning server is thereafter configured to send the provisioning information to the STB using the identifier for the STB.

Still further disclosed is a STB (or similar device) including a processor and storage device, according to an embodiment of the invention. The STB is configured to determine a STB address and to determine a provisioning stream identifier and an authorization server identifier from a broadcast stream. The STB also prepares a provisioning request. The provisioning request includes the provisioning stream identifier, the authorization server identifier, and the STB address. The STB is configured to thereafter send the provisioning request to the provisioning server.

Embodiments of the present invention allow the network to auto provision an "out of carton" STB that is connected to it with minimal functionality without first assigning the STB to a user's account. An "out of carton" STB is one that has not been added to inventory nor has a configuration loaded by which it can function in the network. The "out of carton" STB may not have code objects loaded beyond the platform code delivered from the factory. Through the auto-provisioning process, the STB is loaded to inventory, provided a default channel map (with designated default channels), provided appropriate authorizations, complete code download is enabled, and an installer may potentially demonstrate to a subscriber basic functionality including video on demand (VOD). In addition, embodiments of the present invention make use of the conditional states through use of the resident conditional access system to ensure the overall provisioning completes with the assignment of the STB to a billable subscriber account.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Figure 1:
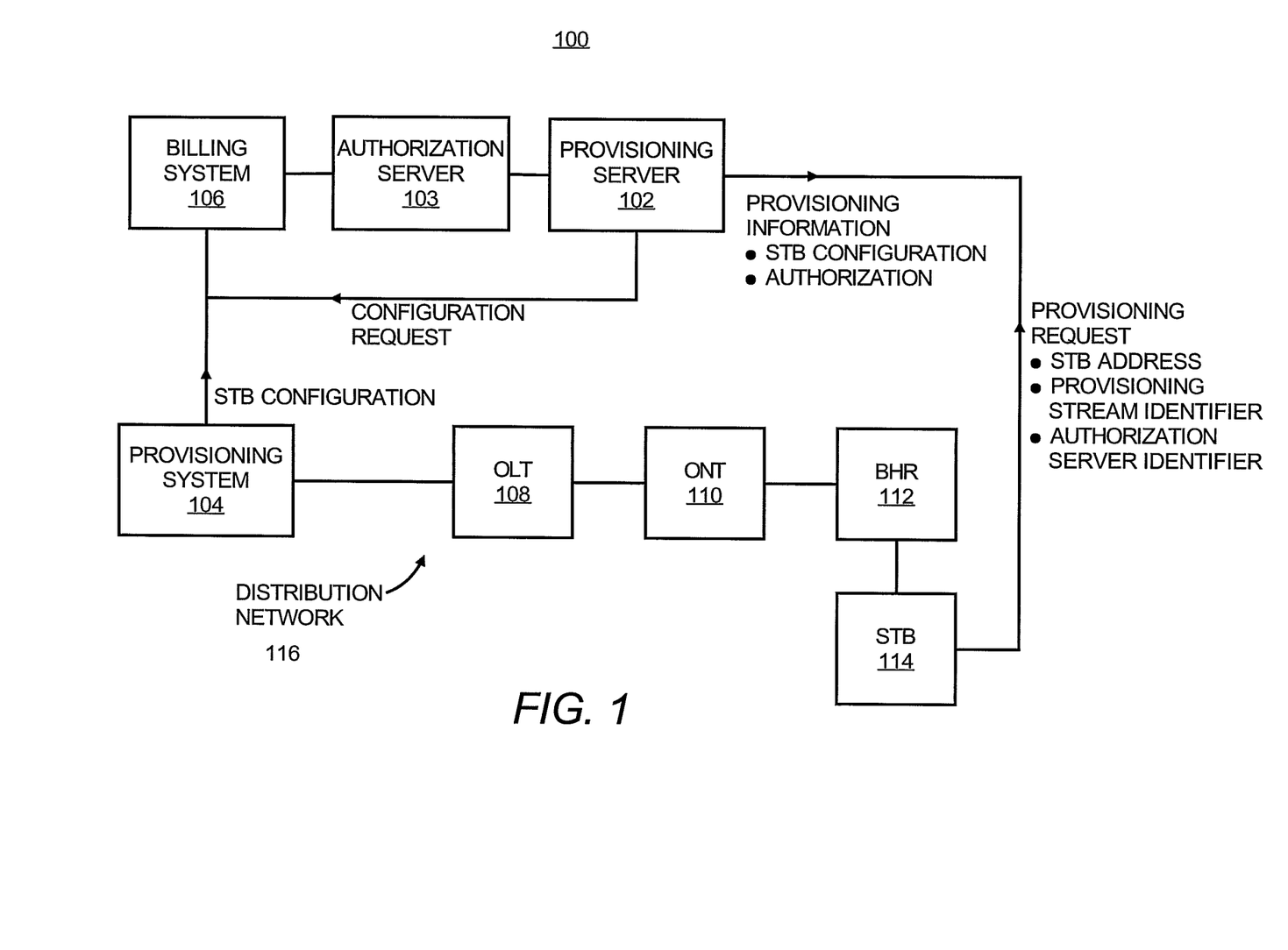
FIG. 1 illustrates a simplified block diagram of a network, according to an embodiment of the invention.

FIG. 1 shows a system 100 for provisioning a set-top box (STB), according to an embodiment. The various components of the system 100 include a provisioning server 102, an authorization server 103, a provisioning system 104, a billing system 106, an optical line terminal (OLT) 108, an optical network terminal (ONT) 110, a broadband home router (BHR) 112 and a STB 114.

The provisioning server 102 is configured to automatically provide provisioning information to the STB 114 during initialization of the STB 114. As such, the interaction between the provisioning server 102 and the STB 114 may be referred to as auto-provisioning. The provisioning system 104 is configured to generate information with which the STB 114 is configured during initialization. The provisioning server 102 is connected to the provisioning system 104 and through the authorization server 103 to the billing system 106. The provisioning server 102 and the STB 114 are connected via a network (e.g., passive optical network (PON), hybrid fiber coaxial (HFC), digital subscriber line access multiplexer (DSLAM) or internet protocol (IP)) network). More than one authorization server may exist in a system and each authorization server or provisioning server can produce more than one provisioning stream. Identifiers carried in the provisioning stream identify both the provisioning stream and the authorization server that provides authorizations into the stream.

According to an embodiment, a distribution network 116 is a PON network, but other types of distribution networks may be used. Because of the optical transmission of the signal from the service provider, the PON has no power requirements or active electronic parts after the signal has been propagated through the network. The PON carries optical fiber cabling and signals all or most of the way to the subscriber. The system 100 can be described as fiber-to-the-building (FTTB), fiber-to-the-curb (FTTC), or fiber-to-the-home (FTTH), depending on where the PON terminates. The PON includes the OLT 108, which is located at the service provider's office and the ONT 110, which is one of a number of ONTs located near subscribers. For instance, up to 32 ONTs may be connected to the OLT 108. In this embodiment, the provisioning network or OOB channel is carried across the PON.

In the subscriber's premises, the BHR 112 connects to the PON at the ONT 110. The BHR 112 is provisioned with a wide area network (WAN) side IP address, used for incoming and outgoing IP packets. According to an embodiment, the BHR 112 is a network address translator (NAT) router, configured for network or IP masquerading, whereby an address space, typically consisting of multiple private network addresses, is hidden behind the WAN IP address in another, usually public address space. Further, the subscriber premises are presumed to be configured with an existing private virtual circuit (PVC) (not shown) with which a particular subscriber account is associated. The WAN side IP address, the PVC or another identifier provided by the BHR to the set-top may be used to associate a request from the STB 114 to a subscriber account.

When the STB 114 is connected to the network, as described in detail below with respect to FIGS. 2A-2C, the STB 114 is configured to tune into a channel in the distribution network 116 and receive a provisioning network identifier. It will also request an IP address from the local BHR. The STB 114 may be preconfigured or receive information from the BHR to contact a domain name system (DNS) server to identify an address at which to communicate to the provisioning server 102. The STB 114 then sends a provisioning request to the provisioning server 102.

According to an embodiment, the provisioning request includes a STB address, a provisioning stream identifier, and an authorization server identifier. The STB address is a unit address of the STB 114 and is a unique addressable identifier. The provisioning stream identifier identifies the provisioning network and may comprise an out of band (OOB) identification. The OOB refers to a channel carrying device management information and is also referenced as the provisioning network. The channel may be outside channels providing services to subscribers. The authorization server identifier is an identifier that may be associated with a subscriber premise and may comprise a remote addressable DANIS/DLS (RADD) IP address. The acronym DANIS/DLS refers to a Downloadable Addressable Network Interface System/Download Server. The STB 114 is configured to determine the STB address. Next, the STB 114 may be configured to determine network downstream information, particularly the provisioning stream identifier, by tuning to a broadcast stream and extracting the provisioning stream identifier embedded in the provisioning stream. Finally, the STB 114 is configured to determine the authorization server identifier associated with the authorization server 103. If the authorization server identifier is a RADD IP address, the authorization server identifier identifies an externally facing IP address, which can be used for look up with a simple table (upon initial implementation) to identify a correct (parent) authorization server 103 for the STB 114.

Conventionally, when provisioning a set-top box for a particular subscriber's premises the set-top box is added to the authorization server 103 prior to installation of the set-top box in the subscriber premises. The authorization server 103 manages a set-top database, holds and distributes virtual channel maps, creates encryption and decryption messages and polls set-top boxes, collecting pay-per-view (PPV) buys. The authorization server 103 also communicates with the billing system 106 in order to determine authorizations from the related subscriber account for the STB 114. Further, the authorization server 103 provides secured access control for digital video distribution systems and supports a wide variety of addressable functions including IPPV, Call Ahead PPV, subscription authorizations, and interactive applications.

According to an embodiment of the invention, for purposes of provisioning the STB 114 as described with respect to FIGS. 2A-2C below, the STB 114 is not added to the authorization server 103, i.e., the authorization server database, prior to installation in the subscriber premises. As part of auto-provisioning the STB 114 at the subscriber premises, the STB 114 may be added to the authorization server 103 by the provisioning system 104 in order to finalize provisioning of services purchased by the subscriber where the STB 114 is provisioned in conditional states.

It will be apparent that the system 100 may include additional elements not shown and that some of the elements described herein may be removed, substituted and/or modified without departing from the scope of the system 100. It should also be apparent that one or more of the elements described in the embodiment of FIG. 1 may be optional.

An embodiment of a method in which the system 100 may be employed for provisioning the STB 114 will now be described with respect to the following flow diagram of the methods 200, 220 and 250 depicted in FIGS. 2A-2C. It should be apparent to those of ordinary skill in the art that the methods 200, 220 and 250 represent generalized illustrations and that other steps may be added or existing steps may be removed, modified or rearranged without departing from the scopes of the methods 200, 220 and 250. In addition, the methods 200, 220 and 250 are described with respect to the system 100 by way of example and not limitation, and the methods 200, 220 and 250 may be used in other systems.

Some or all of the operations set forth in the methods 200, 220 and 250 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

The method 200 includes provisioning steps performed at the STB 114, according to an embodiment.

Prior to step 201 and all the steps in the method 200, the STB 114 may be an "out of carton" STB which is not assigned to a user's account. The method 200 allows the network to provide an "out of carton" STB that is connected to it with minimal functionality without first assigning the STB 114 to a user's account. An "out of carton" STB is one that may not have been added to inventory nor has a configuration loaded by which it can function in the network. The "out of carton" STB may not have code objects loaded beyond the platform code delivered from the factory. Through the STB provisioning described herein, after the out-of-carton STB is connected to the network at the subscriber's premises, the STB 114 is loaded into the service provider's inventory, provided a default channel map (with designated default channels), provided appropriate authorizations, complete code download is enabled, and an installer may potentially demonstrate to a subscriber basic functionality including video on demand (VOD).

At step 201, the STB 114 is connected to the distribution network 116 and a circuit. For example, the circuit is a PVC. The PVC is established in the subscriber's premises. The STB 114 thereafter determines the STB address, the provisioning stream identifier, and the authorization server identifier.

According to an embodiment, the STB 114 is operable to determine the STB address, which is the unit address of the STB 114. The STB 114 then tunes to a broadcast stream, which may be a provisioning stream in the OOB, to receive the following among other information: the provisioning stream identifier, which is available in the trace route message, and the authorization server identifier, for instance the RADD IP address which is available in the trace route message. The provisioning stream identifies downstream plant and associated default virtual channel map (VCM) identification. The RADD IP address is used in conjunction with the OOB ID to determine the authorization server.

Further, the STB 114 may be required to perform other functions depending on the architecture of the system used by the cable operator. For instance, in one common architecture, a channel forming a return path within the PVC is established between STB 114 and the BHR 112. The STB 114 then communicates with the BHR 112 using dynamic host configuration protocol (DHCP) to acquire an IP address lease. The BHR 112 provides information to the STB 114 using DHCP including a previously disclosed (for instance a well known) name of the provisioning server 102, a local broadband server in the architecture. The BHR 112 is configured with the information to be passed onto the STB 114 upon request of DHCP IP address leases as part of provisioning of the BHR 112. This is required for the STB 114 to operate behind a NAT router, such as the BHR 112.

Alternately, the STB 114 may be configured to send a different message to convey the provisioning request and the identity of the STB 114 using the OOB stream to the provisioning server 102, particularly if the system 100 is an RF return, which is restricted in communication capability. The alternative method is required to hole punch the NAT router, wherein the hole punch establishes bidirectional connections between the STB 114 and the provisioning server 102 through the NAT router.

At step 202, the STB 114 sends a provisioning request to the provisioning server 102. The provisioning request may include the STB address, the provisioning stream identifier, and the authorization server identifier.

According to an embodiment, if the STB 114 is located behind a NAT router, the STB 114 uses a well known name in the DNS to be able to use the NAT router to access a public network and locate the provisioning server 102. The STB 114 thereafter sends the provisioning request, which may also be referred to as an auto provision request or a sign on request, to the provisioning server.

The provisioning server 102 receives the provisioning request and processes the provisioning request as will be described with respect to FIG. 2C and the method 250 below.

At step 203, the STB 114 receives the provisioning information from the provisioning server 102. The STB 114 then sends confirmation to the provisioning server 102 that it received the provisioning information. The provisioning information may include a set of configuration messages. According to an embodiment, the provisioning information is determined by the provisioning server 102 based on a specific service authorization for the subscriber account linked to the PVC in which the STB 114 is located. The provisioning server identifies the PVC from the RADD IP address sent in the provisioning request and thereby determines the subscriber account associated with the STB 114.

The specific service authorization ties the STB 114 to the subscriber account and the services authorized for the account. The provisioning server may communicate with the billing system 106 using the authorization server 103 in order to determine the specific service authorization.

At step 204, the STB 114 applies the provisioning information to the STB 114 using the specific service authorization. For instance, provisioning for the STB 114 may then be finalized with the STB 114 being configured for services according to the specific service authorization. Examples of different authorizations may be for different TV channel packages, such as basic cable, premium channels, etc. Provisioning includes storing basic code and a channel map received in the provisioning information and making the STB 114 available to receive services. Alternately, the STB 114 may be configured using conditional states as described herein below with respect to FIG. 2B.

Figure 2A:
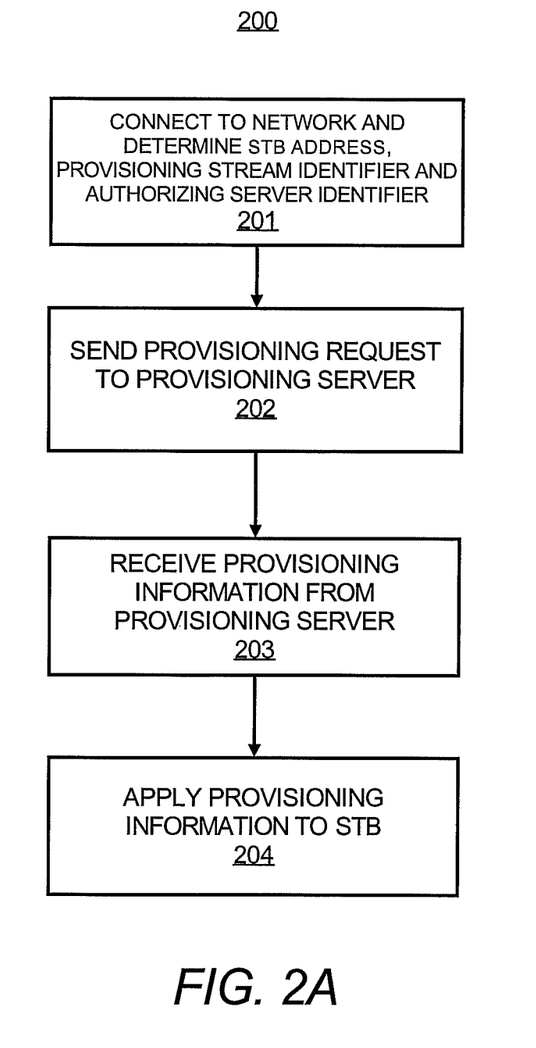
FIG. 2A illustrates a method for provisioning a set-top box, according to an embodiment of the invention.
Figure 2B:
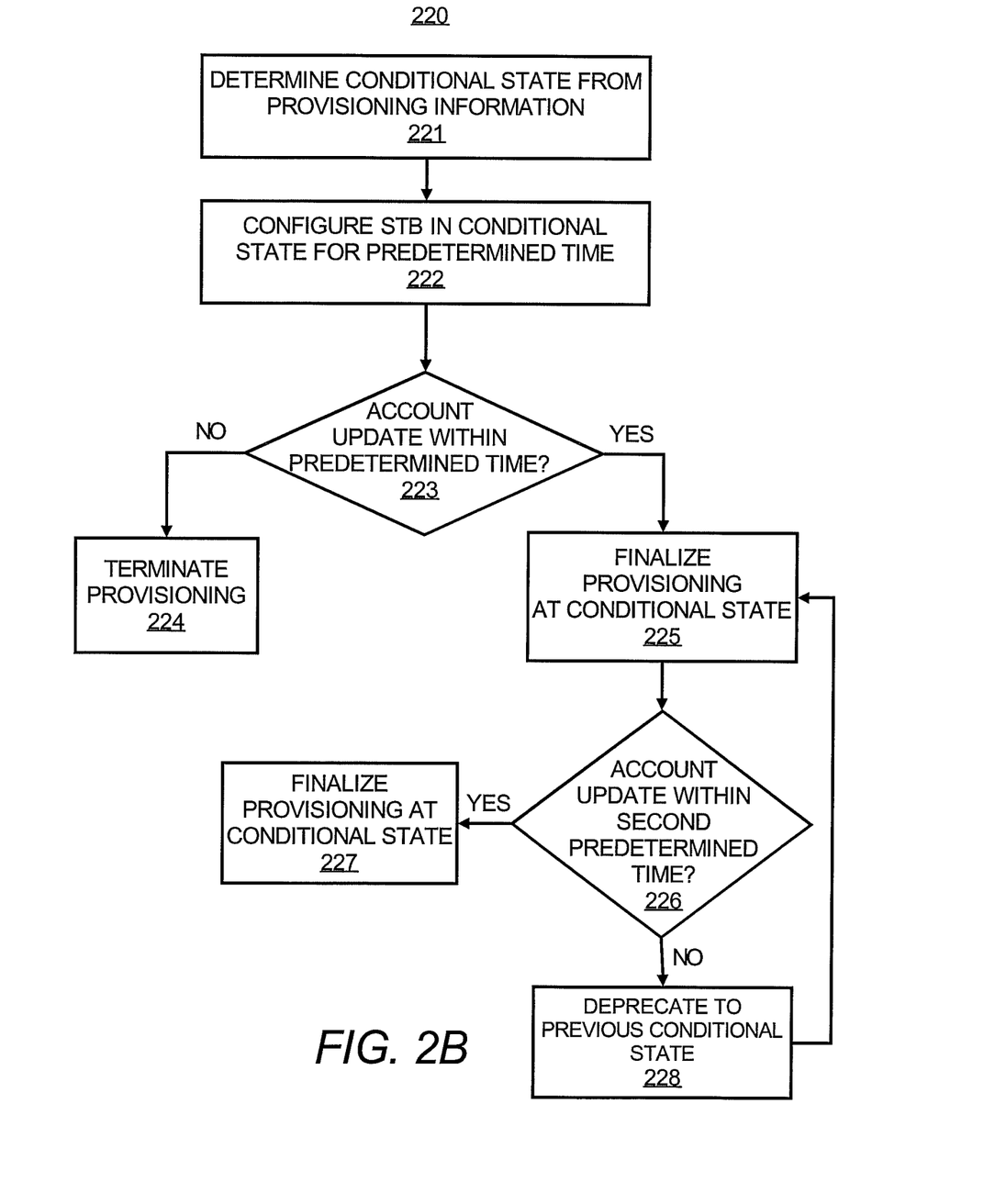
FIG. 2B illustrates a method for provisioning a set-top box, according to another embodiment of the invention.

As shown in FIG. 2B, at step 221, the STB 114 determines the conditional state from the provisioning information. The configuration of the STB 114 and the conditional state are based on the specific service authorization and interaction from the subscriber and is available for a predetermined time. Examples of conditional states may include different levels of services that are available to the STB 114. This may include premium channels that have not been paid for but are included with a basic subscription package for a predetermined time and, if the subscriber does not pay for the premium channels, the service reverts to the basic subscription package. The functionality of the STB 114 is dependent on the completion of the provisioning process and is secured using the specific service authorization and the conditional access system that governs the services available to the STB 114. The STB 114 is also authenticated using the authorization server 103. For one or more of the embodiments described herein, before provisioning information is sent to the STB 114, the STB 114 is authenticated, for example, by the authorization server 103. Once authenticated, then the provisioning information is sent to the STB 114, and the STB 114 is given access to services. Authentication may be performed through a known device authentication procedure, which may include the STB 114 providing information to the authorization server 103 to be used to authenticate the STB 114.

The STB 114 may be configured in one of a first conditional state, a second conditional state, and a third conditional state, by way of example. There may be more or less number of conditional states. In the first conditional state, the STB 114 is put in a basic configuration and does not require contact with the subscriber account. The basic configuration includes minimal functionality such as a default channel map, a complete code download, and basic functionality to enable an installer to demonstrate features to a subscriber. In the second conditional state, the STB 114 receives services based on the specific service authorization associated with the subscriber account. In the third conditional state, the STB 114 receives services based on the specific service authorization associated with the subscriber account as in the second conditional state. In addition, in the third conditional state the STB 114 receives access to additional service with a second predetermined time limit. The STB 114 is operable to continue the additional service in response to a second specific service authorization within the second predetermined time limit or to deprecate to services based on the specific service authorization at the end of the second predetermined time limit. These additional services may include services designated as "up-sell" services by the service provider.

At step 222, the STB 114 configures itself into the determined conditional state. For example, the STB 114 is configured in one of the three conditional states described above. The STB 114 may be configured to maintain itself in the conditional state dependent on whether the subscriber account correlating to the STB 114 has been updated within the predetermined time limit. The service provider may select the predetermined time limit. The subscriber account may be updated through the STB 114 or through steps independent of the STB 114, such as telephone billing authorization. The update may be paying for a particular service within the predetermined time limit or otherwise becoming authorized for the service within the predetermined time limit.

At step 223, the STB 114 determines whether the subscriber account has been updated within the predetermined time limit.

At step 224, in response to a determination that the subscriber account has not been updated within the predetermined time, the STB 114 terminates provisioning for the STB 114. The end user will thereafter not be able to access any services through the STB 114.

At step 225, in response to a determination that a subscriber account has been updated within the predetermined time limit, the conditional state is finalized. For example, the service provider continues to provide the level of service identified by the conditional state.

At step 226, if the STB 114 has been provisioned in a conditional state that has a second predetermined time limit, such as the third conditional state, the STB 114 determines whether the subscriber account has been updated for the additional services within the second predetermined time limit. This step may only be performed for the STB 114 if the conditional state at step 222 has additional services and a second predetermined time limit, such as for the third conditional state. For example, a premium channel may be provided for three months from installation of the set-top box with access to the premium channel being canceled after the three months if the subscriber does not pay for the premium channel.

At step 227, in response to a determination that the subscriber account has been updated for the additional services within the second predetermined time limit, the STB 114 finalizes provisioning at the third conditional state.

At step 228, in response to a determination that the subscriber account has not been updated for the additional services within the second predetermined time limit, the STB 114 deprecates its configuration to the services based on the specific service authorization at the end of the second predetermined time limit. This may include returning only to the services provided within the first predetermined time limit.

A method 250 of provisioning the STB 114 using the provisioning server 102, according to an embodiment, is described below. These steps may be performed by the provisioning server 102.

Figure 2C:
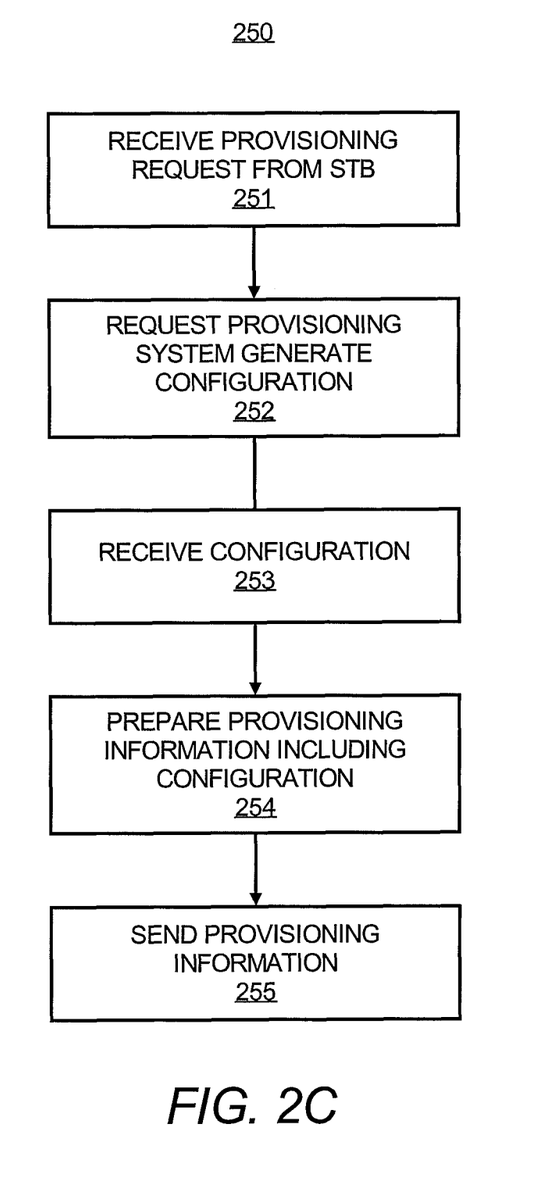
FIG. 2C illustrates a method for provisioning a set-top box, according to yet another embodiment of the invention.

At step 251, as shown in FIG. 2C, the provisioning server 102 receives the provisioning request from the STB 114. The provisioning request includes a provisioning stream identifier, an authorization server identifier, and a STB address. The STB address is a unique addressable identifier for the STB 114. The provisioning stream identifier and the STB address are usable to identify the STB 114 to the provisioning server independent of the authorization server identifier and a subscriber account. The provisioning server does not have to associate the STB 114 to a subscriber account in order to send provisioning information to the STB 114 as will be described in the following steps of the method 250.

At step 252, the provisioning server 102 requests the provisioning system 104 to generate a configuration for the STB 114. The configuration includes a default channel map and basic code.

At step 253, the provisioning server 102 receives the configuration for the STB 114 from the provisioning system 104.

At step 254, the provisioning server 102 prepares the provisioning information. The provisioning information may include a conditional state as described above with respect to FIG. 2B and step 221 of the method 220, dependent on whether the provisioning server communicates with the billing system 106 through the authorization server 103 in order to determine specific service authorization. The provisioning server 102 may correlate the STB 114 to one of a plurality of subscriber accounts using the billing system 106, checking the subscriber account for specific service authorization.

At step 255, the provisioning server 102 sends the provisioning information to the STB 114 using the identifier for the STB 114. The STB 114 thereafter configures the STB 114 as previously described with respect to FIG. 2A and FIG. 2B.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

Figure 3:
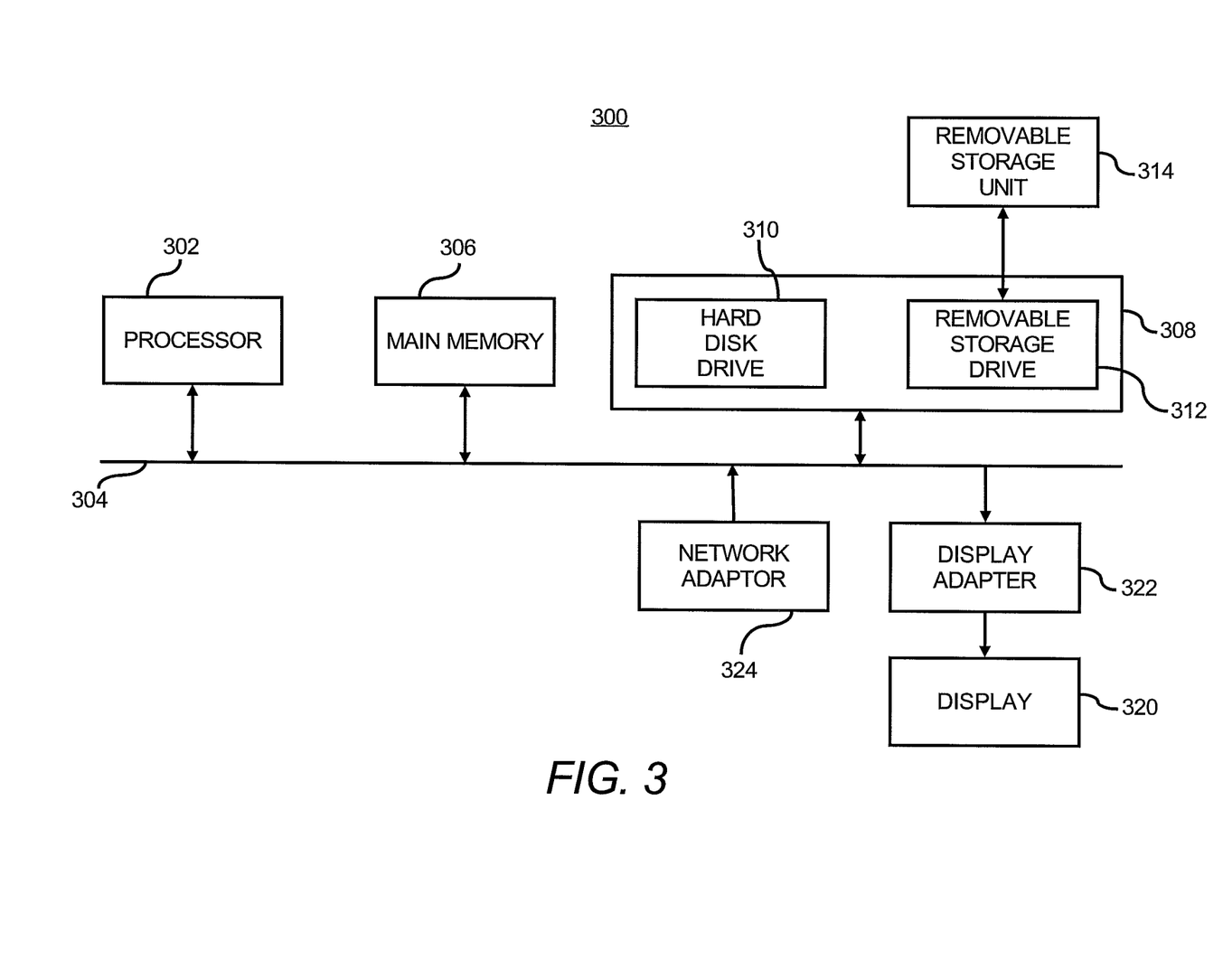
FIG. 3 shows a block diagram of a basic hardware platform that may be used in the device for provisioning a set-top box, according to an embodiment of the invention.

FIG. 3 illustrates a block diagram of a basic hardware platform 300 to implement or execute one or more of the processes depicted in FIGS. 1-2C, according to an embodiment. It should be understood that the illustration of the basic hardware platform 300 is a generalized illustration and that the basic hardware platform 300 may include additional components and that some of the components described may be removed and/or modified without departing from a scope of the basic hardware platform 300. According to an embodiment, the basic hardware platform 300 comprises the set-top box 114 depicted in FIG. 1. According to another embodiment basic hardware platform 300 comprises the provisioning server 102 depicted in FIG. 1.

The computing apparatus 300 includes a processor 302 that may implement or execute some or all of the steps described in one or more of the processes depicted in FIGS. 2A, 2B, and 2C. Commands and data from the processor 302 are communicated over a communication bus 304. The computing apparatus 300 also includes a main memory 306, such as a random access memory (RAM), where the program code for the processor 302, may be executed during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for one or more of the processes depicted in FIGS. 2A-2C may be stored.

The removable storage drive 310 reads from and/or writes to a removable storage unit 314 in a well-known manner. User input and output devices may include a keyboard 316, a mouse 318, and a display 320. A display adaptor 322 may interface with the communication bus 304 and the display 320 and may receive display data from the processor 302 and convert the display data into display commands for the display 320. In addition, the processor(s) 302 may communicate over a network, for instance, the Internet, LAN, etc., through a network adaptor 324.

Embodiments of the present invention allow a network to auto provision an "out of carton" set-top box that is connected to it with minimal functionality. The set-top box is provided a default channel map (with designated default channels), complete code download is enabled, and an installer may potentially demonstrate to a subscriber basic functionality including video on demand (VOD). In addition, embodiments of the present invention make use of the conditional states to ensure the overall provisioning completes with the assignment of the device to a billable subscriber account.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method of provisioning a set-top box (STB) via a provisioning server in a subscriber based cable television network, the provisioning server including a processor and a storage device, the method comprising:
    receiving a provisioning request from the STB, wherein, at the time of receipt of the provisioning request from the STB, the STB is both unassigned to a subscriber account in the subscriber based cable television network and is unassigned to an authentication server in an authentication server database that identifies service authorizations associated with respective set-top-boxes,
    wherein the provisioning request includes:
        a provisioning stream identifier and an authorization server identifier extracted by the STB from a broadcast stream upon tuning to the broadcast stream in the subscriber based cable television network, the provisioning stream identifier identifying a provisioning stream and the subscriber based cable television network, and the authorization server identifier identifying an authorization server able to determine a specific service authorization associated with the user premises, and a STB address including a unique addressable identifier that is determined by the STB;
    identifying, from the provisioning stream identifier and the STB address in the provisioning request, a virtual circuit established at a user premises linked to a specific service authorization;
    requesting a provisioning system to generate a configuration for the STB based on the specific service authorization, wherein the configuration includes a channel map and basic code;
    sending provisioning information to the STB including the configuration based on the specific service authorization using the provisioning stream identifier received in the provisioning request for provisioning the STB prior to assignment of the STB to a subscriber account, wherein services are accessible to the provisioned STB prior to the assignment of the STB to a subscriber account: and
    after provisioning information has been provided to the STB, determining a subscriber account for the STB corresponding to the specific service authorization with the subscriber based cable television network to provide services to the STB based on the subscriber account and the corresponding specific service authorization.

2. The method of claim 1, wherein the provisioning system prepares the provisioning information to include the configuration based on the specific service authorization wherein preparing the provisioning information further comprises:
    correlating the STB to one of a plurality of subscriber accounts using a billing system in conjunction with the authorization server identifier;
    checking the subscriber account for specific service authorization; and
    determining the provisioning information based on the specific service authorization.

3. The method of claim 1, wherein receiving the provisioning request from the STB comprises:
    receiving the STB address determined by the STB;
    receiving the provisioning stream identifier, and the authorization server identifier for the STB from the broadcast stream; and
    receiving the provisioning request prepared by the STB.

4. The method of claim 1, wherein:
    the provisioning information from the provisioning server is received by the STB; and
    the provisioning information is applied to the STB to configure the STB into the configuration.

5. The method of claim 4, wherein the provisioning information applied to the STB to configure the STB into the configuration comprises:
    applying the provisioning information to the STB using a specific service authorization, wherein access to a specific service is provided based on the specific service authorization.

6. The method of claim 4, wherein the provisioning information applied to the STB to configure the STB into the configuration comprises:
    receiving the provisioning information in a conditional state, wherein the provisioning information includes authorization information;
    configuring the STB in the conditional state, wherein the STB in the conditional state is configured for a predetermined time limit;

determining whether the subscriber account correlating to the STB has been updated within the predetermined time limit, wherein the predetermined time limit is selected by a service provider; and in response to a determination that the subscriber account has been updated within the predetermined time limit, finalizing the provisioning for the STB in the conditional state through an authorization server authorization; and in response to a determination that the subscriber account has not been updated within the predetermined time limit, terminating provisioning for the STB.

7. The method of claim 6, wherein the conditional state is a first state providing access to a basic configuration, wherein the basic configuration includes a channel map, basic code and basic functionality.

8. The method of claim 6, wherein the conditional state is a second state providing access to a service based on specific service authorization.

9. The method of claim 6, wherein the conditional state is a third state providing access to a first service based on a specific service authorization, and providing access to an additional service with a second predetermined time limit, wherein the STB is operable to continue the additional service in response to a second specific service authorization provided within the second predetermined time limit, and deprecate to only the first service based on the specific service authorization at the end of the second predetermined time limit.

10. The method of claim 6, wherein the conditional state is authenticated and secured within the STB by a specific service authorization.

11. A provisioning server configured to send information to a STB in a subscriber based cable television network for provisioning the STB to receive services, the provisioning server comprising:

a processor; and a storage device storing the provisioning information, wherein the processor:

receives a provisioning request from the STB, wherein, at the time of receipt of the provisioning request from the STB, the STB is both unassigned to a subscriber account in the subscriber based cable television network and is unassigned to an authentication server in an authentication server database that identifies service authorizations associated with respective set-top-boxes, wherein the provisioning request includes a provisioning stream identifier and an authorization server identifier extracted by the STB from a broadcast stream upon tuning to the broadcast stream in the subscriber based cable television network, the provisioning stream identifier identifying a provisioning stream and the subscriber based cable television network, and the authorization server identifier identifying an authorization server able to determine a specific service authorization associated with the user premises, and a STB address including a unique addressable identifier that is determined by the STB, identifying, from the provisioning stream identifier and the STB address in the provisioning request, a virtual circuit established at a user premises linked to a specific service authorization; and generates a request to a provisioning system to provide a configuration for the STB based on the specific service authorization, wherein the configuration includes a channel map and basic code;

sends provisioning information including the configuration based on the specific service authorization using the provisioning stream identifier received in the provisioning request for provisioning the STB prior to assignment of the STB to a subscriber account, wherein services are accessible to the provisioned STB prior to the assignment of the STB to a subscriber account; and after provisioning information has been provided to the STB, determines a subscriber account for the STB corresponding to the specific service authorization with the subscriber based cable television network to provide services to the STB based on the subscriber account and the corresponding specific service authorization.

12. The provisioning server of claim 11, wherein the provisioning system prepares the provisioning information to include the configuration based on the specific service authorization, wherein preparing the provisioning information further comprises:

correlating the STB to one of a plurality of subscriber accounts using a billing system in conjunction with the authorization server identifier;

checking the subscriber account for the specific service authorization; and determining the provisioning information based on the specific service authorization.

13. A set-top box (STB) configured at a user premises to be provisioned in a subscriber based cable television network using received provisioning information, the STB comprising:

a processor; and a storage device storing provisioning information, wherein the processor:

determines a STB address;

extracts a provisioning stream identifier and an authorization server identifier from a broadcast stream upon tuning to the broadcast stream in the subscriber based cable television network;

wherein the provisioning stream identifier and the STB address are usable to identify a virtual circuit established at the user premises linked to a specific service authorization; and wherein the authorization server identifier identifies an authorization server able to determine a specific service authorization associated with the user premises;

prepares a provisioning request, wherein the provisioning request includes the STB address, the provisioning stream identifier, and the authorization server identifier;

sends the provisioning request to a provisioning server; and in response to the provisioning request, receives provisioning information including an STB configuration based on the specific service authorization linked to the virtual circuit;

provisioning the STB prior to assignment of the STB to a subscriber account; and receives basic services over the subscriber based cable television network prior to the assignment of the STB to a subscriber account.

14. The STB of claim 13, wherein the processor receives the provisioning information from the provisioning server; and applies the provisioning information to the STB to configure the STB into the configuration.

15. The STB of claim 14, wherein applying the provisioning information to the STB to configure the STB into the configuration comprises:
applying the provisioning information to the STB using a specific service authorization, wherein access to a specific service is provided based on the specific service authorization.

16. The STB of claim 14, wherein applying the provisioning information to the STB to configure the STB into the configuration comprises:
receiving the provisioning information in a conditional state, wherein the provisioning information includes authorization information;
configuring the STB in the conditional state, wherein the STB in the conditional state is configured for a predetermined time limit;
determining whether a subscriber account correlating to the STB has been updated within the predetermined time limit, wherein the predetermined time limit is selected by a service provider; and
in response to a determination that the subscriber account has been updated within the predetermined time limit, finalizing the provisioning for the STB in the conditional state through an authorization server authorization; and
in response to a determination that the subscriber account has not been updated within the predetermined time limit, terminating provisioning for the STB.

17. The STB of claim 16, wherein the conditional state is a first state providing access to a basic configuration, wherein the basic configuration includes a channel map, basic code and basic functionality.

18. The STB of claim 16, wherein the conditional state is a second state providing access to a specific service based on the specific service authorization.

19. The STB of claim 16, wherein the conditional state is a third state providing access to a specific service based on the specific service authorization, and providing access to an additional service with a second predetermined time limit.

20. The STB of claim 16, wherein the additional service is continued in response to a second specific service authorization within the second predetermined time limit, and
the additional service is discontinued at the end of the second predetermined time limit if the second specific service authorization is not provided within the second predetermined time limit.

* * * * *